(12) United States Patent
Coletta et al.

(10) Patent No.: US 7,849,405 B1
(45) Date of Patent: Dec. 7, 2010

(54) CONTEXTUAL USER-CONTRIBUTED HELP INFORMATION FOR A SOFTWARE APPLICATION

(75) Inventors: Paul E. Coletta, Carlsbad, CA (US); Floyd J. Morgan, Carlsbad, CA (US)

(73) Assignee: Intuit Inc., Mountain View, CA (US)

( * ) Notice: Subject to any disclaimer, the term of this patent is extended or adjusted under 35 U.S.C. 154(b) by 299 days.

(21) Appl. No.: 11/612,377

(22) Filed: Dec. 18, 2006

(51) Int. Cl.
   *G06F 3/00* (2006.01)
(52) U.S. Cl. .................................. 715/708; 715/751
(58) Field of Classification Search .................. 715/751, 715/752, 708, 709, 714
   See application file for complete search history.

(56) References Cited

U.S. PATENT DOCUMENTS

| | | | |
|---|---|---|---|
| 6,467,080 B1 * | 10/2002 | Devine et al. ................ | 717/123 |
| 6,799,198 B1 | 9/2004 | Huboi et al. | |
| 6,871,322 B2 * | 3/2005 | Gusler et al. ................ | 715/708 |
| 6,928,625 B2 * | 8/2005 | Makinen ....................... | 715/822 |
| 6,970,931 B1 | 11/2005 | Bellamy et al. | |
| 6,983,271 B2 | 1/2006 | Morrow et al. | |
| 6,990,532 B2 | 1/2006 | Day et al. | |
| 7,024,658 B1 * | 4/2006 | Cohen et al. ................. | 717/117 |
| 7,240,297 B1 * | 7/2007 | Anderson et al. ........... | 715/854 |
| 2001/0037268 A1 * | 11/2001 | Miller .......................... | 705/31 |
| 2002/0111888 A1 * | 8/2002 | Stanley et al. ................ | 705/31 |
| 2002/0167539 A1 * | 11/2002 | Brown et al. ................. | 345/705 |
| 2006/0036991 A1 | 2/2006 | Biazetti et al. | |
| 2006/0085750 A1 * | 4/2006 | Easton et al. ................ | 715/708 |
| 2006/0224503 A1 | 10/2006 | Luo | |
| 2006/0259861 A1 | 11/2006 | Watson | |
| 2007/0067275 A1 * | 3/2007 | Shekel ........................... | 707/4 |
| 2007/0129977 A1 * | 6/2007 | Forney ........................... | 705/7 |
| 2008/0126949 A1 * | 5/2008 | Sharma ........................ | 715/751 |

* cited by examiner

*Primary Examiner*—Dennis-Doon Chow
*Assistant Examiner*—Rashawn Tillery
(74) *Attorney, Agent, or Firm*—Osha • Liang LLP

(57) ABSTRACT

A system and method for displaying contextual, user-contributed help information in a software application are disclosed. The software application may display a series of user interface screens that guide a user through a process. For each of at least a subset of the screens, the software application may be operable to display contextual help information for the screen, where the contextual help information includes information that has been contributed by other users of the software application. The software application may also enable the user to contribute new help information related to various ones of the screens, e.g., so that the new help information is subsequently viewable by other users of the software application.

17 Claims, 17 Drawing Sheets

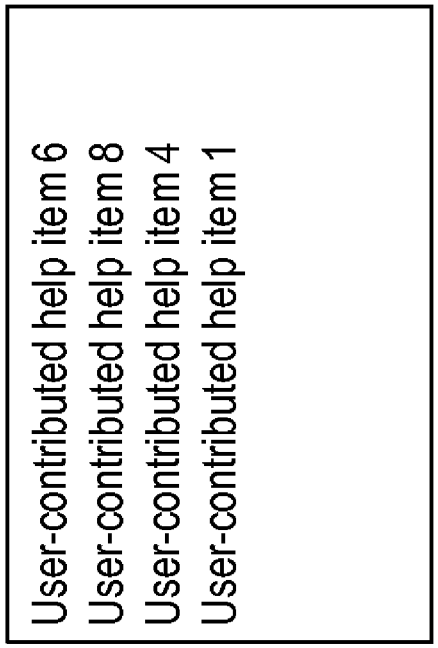
FIG. 7B

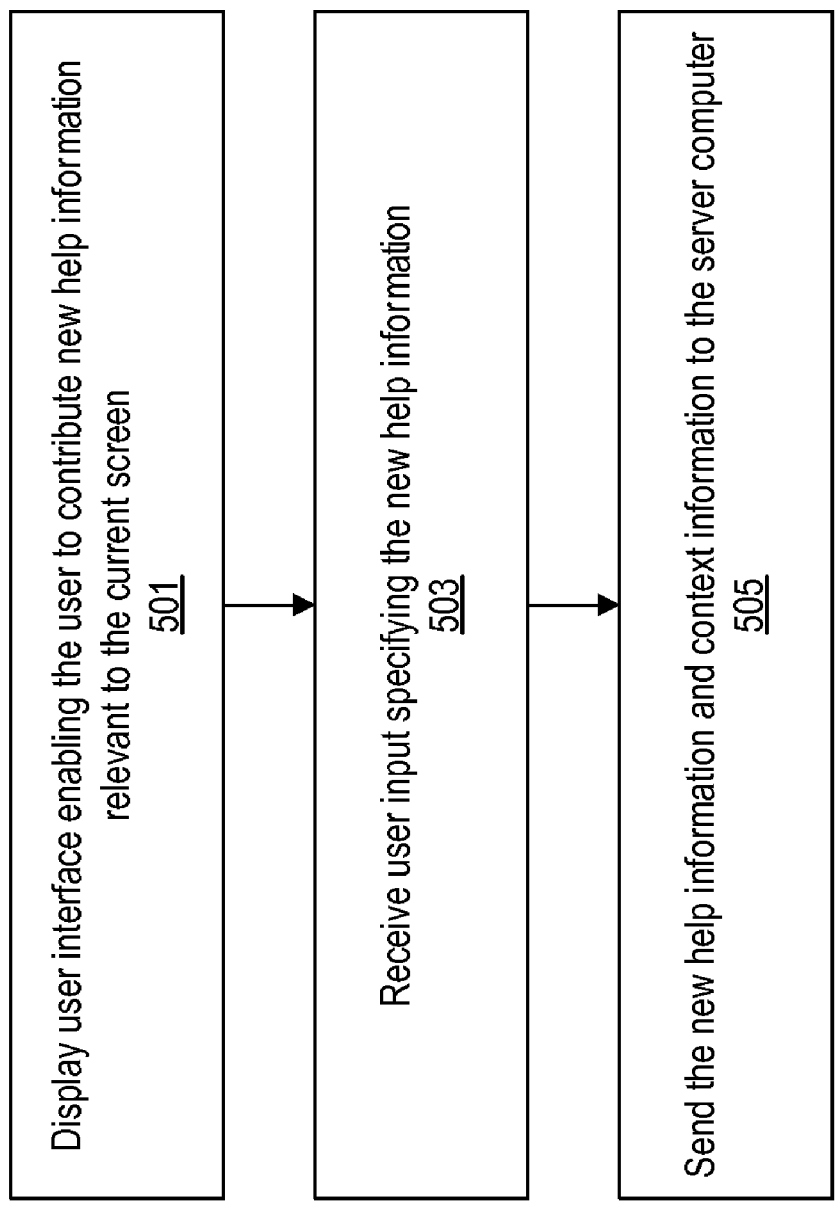

Live Community

Create User ID / Exit

| Personal Info | Income | Federal Taxes | Federal Review | State Taxes | Print & File |

Deductions | Taxes and Credits | Miscellaneous

Federal Refund
$0

Where Do I Enter?
Search For a Topic...

Get Answers
Find Tax Help
Using The Tax Program
Contact Us

My Return
View Tax Summary
Print My Return
View Past Returns
Show Topic List
Other Options
Debug Options

Report Your Income and Returns

Enter any information that applies to this business in the spaces below.

Income or Sales Not Reported on 1099
Explain This                              [          ]

Returns and Allowances Explain This       [          ]
(Enter as a Positive Number)

Other Income Explain This                 [          ]

◀ Back                                    Continue

LiveCommunity Alpha Explain This

Ask a question
Enter your question here and let
your peers and our pros help
                                        800
                        ( Ask )

Answered questions                   802
🗨 Is sales tax collected income?

Unanswered questions                 804
🗨 Interest in business checking
🗨 Sales not reported on 1099

CONTEXTUAL USER-CONTRIBUTED HELP INFORMATION FOR A SOFTWARE APPLICATION

BACKGROUND

Software applications can aid users in performing various kinds of complex processes. For example, tax preparation software applications guide users through the process of preparing a tax return. Such software applications often provide a help system that offers help information for various aspects of the process. The help information is typically provided by the vendor of the software application and attempts to answer the most common questions that users have. For example, a tax preparation software application may provide help information that answers basic questions about the tax code or addresses common tax scenarios faced by many users.

However, for a complex process, it is very difficult to anticipate all of the questions that users may have about the process or to adequately address all of the scenarios that users may encounter. Existing help systems generally do not provide sufficiently detailed information to address many of the questions users have when performing a complex process, such as preparing a tax return.

SUMMARY

Various embodiments of a system and method for displaying contextual, user-contributed help information in a software application are disclosed herein. The software application may be operable to display a series of user interface screens that guide a user through a process. For each screen in at least a subset of the screens, the method may operate to determine contextual help information to display for the screen and to display the contextual help information. The contextual help information may include help information contributed by other users of the software application.

Further embodiments of the method may comprise receiving user input contributing new help information for a given user interface screen and storing the new help information. The new help information may subsequently be displayed when other users navigate to the user interface screen while interacting with the software application.

BRIEF DESCRIPTION OF THE DRAWINGS

A better understanding of the invention can be obtained when the following detailed description is considered in conjunction with the following drawings, in which:

FIG. 7B illustrates an example in which two different sets of user-contributed help items are displayed for the same user interface screen on two different client computers;

FIG. 9 is a flowchart diagram illustrating one embodiment of a method for adding a new user-contributed help item for a user interface screen; and FIGS. 10-16 illustrate examples of user interface screens for a tax preparation software application that implements embodiments of the methods of FIGS. 8 and 9.

Figure 1:
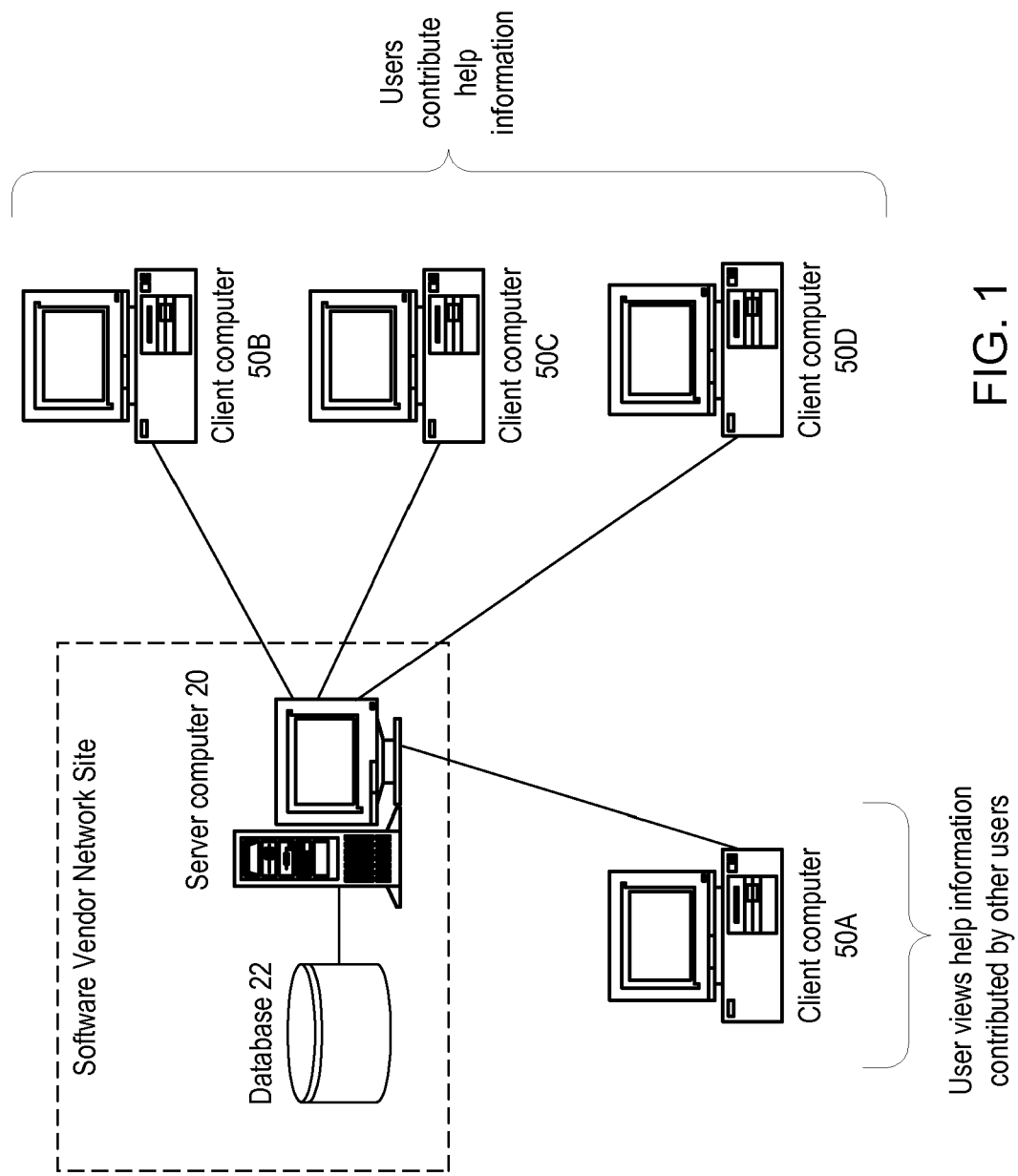
FIG. 1 illustrates one embodiment of a system that provides contextual, user-contributed help information for a software application.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Various embodiments of a system and method for displaying contextual, user-contributed help information in a software application are disclosed herein. The software application may aid users in performing a process. For example, the software application may display a series of user interface screens that guide a user through the process. For each of at least a subset of the screens, the software application may be operable to display contextual help information for the screen, where the contextual help information includes information that has been contributed by other users of the software application. The software application may also enable the user to contribute new help information related to various ones of the screens, e.g., so that the new help information is subsequently viewable by other users of the software application within the same context.

In various embodiments, the software application may be an application that aids users in performing any kind of process. The software application is also referred to herein as "process guidance software". Each screen displayed by the process guidance software may request the user to answer questions or specify information relevant to the process. As one example, in one embodiment the process guidance software may aid users in preparing a tax return. For example, the process guidance software may display a series of screens requesting the user to supply information regarding the user's tax situation and may automatically complete one or more tax return forms based on the user's input. In other embodiments the process guidance software may aid users in performing various other kinds of processes, such as processes related to business accounting, financial management, computer programming, scientific analysis, etc.

FIG. 1 illustrates one embodiment of a system that provides contextual, user-contributed help information for a software application. As shown, the system includes a plurality of client computers 50. Each client computer 50 may be operable to execute process guidance software (referred to as the client-side process guidance software) that displays a series of user interface screens on a display device of the respective client computer 50, as described above.

Various embodiments of the system may use different kinds of client-server models. For example, in some embodiments a thin client architecture may be used such that the client-side process guidance software includes a standard web browser and little or no other executable components. For example, the web browser may communicate with server-side process guidance software to receive web pages and may render HTML code, javascript code, and other elements found in the web pages to present a series of user interface screens that guide the user through the process. As another example, in some embodiments the client-side process guidance software may be implemented as more of a thick client program. As one example, the user of a client computer 50 may install a specialized tax preparation software program on the client computer 50. For example, the specialized tax preparation software program may display its own user graphical interface that presents the user with the series of user interface screens that guide the user through the process. Regardless of how the client-side process guidance software is implemented on a given client computer 50, the client-side process guidance software may communicate with server-side process guidance software on one or more server computers to perform the functions described below.

For each screen in at least a subset of the screens, the client-side process guidance software may enable users to contribute help information which is contextually relevant for the given screen and which they believe may be useful to other users. For example, when displaying a given screen, the client-side process guidance software executing on a given client computer 50 may display a button or other user interface element which the user of the client computer 50 may select in order to contribute new help information related to that screen. As one example, if the process guidance software is a tax preparation software application and the screen relates to IRA plans then the user may click the button in order to contribute new information regarding tax law as it pertains to IRA plans.

The new help information entered by the user may be sent via a network to a server computer 20, e.g., where the server computer 20 is managed by a vendor of the process guidance software. Software executing on the server computer 20 (referred to as the server-side process guidance software) may receive the new help information contributed by the user and may store the new help information, e.g., in a database 22. In addition to sending the new help information specified by the user, the client-side process guidance software may also send context information for the new help information, such as which screen the new help information relates to, or other context information such as described below. The server-side process guidance software may store the new help information in association with the context information such that the new help information may subsequently be provided to other users when contextually appropriate.

For example, suppose that a user of the client computer 50B contributes new help information related to a first screen of the process guidance software. A user of the client computer 50A may subsequently interact with the client-side process guidance software on the computer 50A and may come to the first screen. When the user comes to the first screen, the client-side process guidance software on the client computer 50A may send the server-side process guidance software on the server computer 20 context information indicating which screen the user is currently viewing, as well as possibly other context information such as described below. Based on this context information, the server-side process guidance software may look up the help information contributed by the user of the client computer 50B from the database 22 and may return this help information to the client-side process guidance software on the client computer 50A. The client-side process guidance software on the client computer 50A may then display the user-contributed help information for the first screen, as described in detail below.

In a similar manner, users of the client computers 50C and 50D may contribute additional help information related to the first screen and/or may contribute help information related to other screens, so that when the user of the client computer 50A comes to a given screen while interacting with the client-side process guidance software on the client computer 50A, the user-contributed help information contributed for that screen by users of each of the other client computers 50 is displayed to the user of the client computer 50A. In a similar manner, the user-contributed help information that is contextually relevant for various screens may be displayed to users of the other client computers 50 when the users come to the respective screens. Thus, the client-side process guidance software executing on a given client computer 50 may communicate with the server-side process guidance software executing on the server computer 20 in order to contribute new help information for various screens and/or in order to receive contextually relevant user-contributed help information for each screen that is displayed.

Although FIG. 1 illustrates a single server computer 20, it is noted that in some embodiments the functions described above may be implemented by a plurality of server computers 20. For example, the server computers may be architected in a tiered manner such that a first server computer 20 handles requests from client computers 50, where the first server computer 20 also communicates with a second server computer 20 in order to store user-contributed help information in or retrieve user-contributed help information from the database 22.

Figure 2:
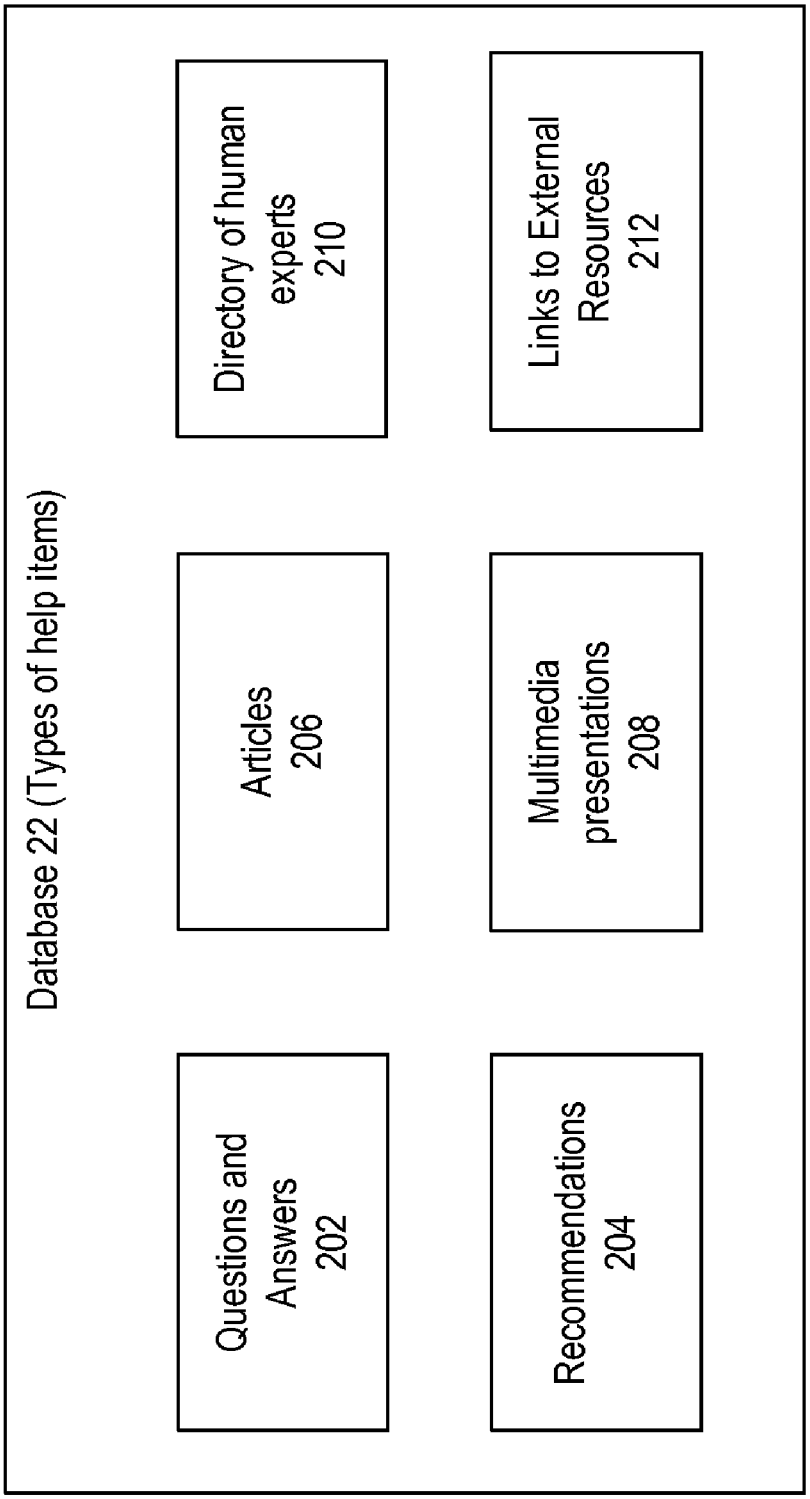
FIG. 2 illustrates examples of different types of user-contributed help information.

In various embodiments the process guidance software may enable users to contribute any kind of help information. FIG. 2 illustrates examples of different types of help information that a user may contribute. For example, a user may contribute question and answer information 202. For example, consider a screen relating to IRA plans in a tax preparation software application. The user may be knowledgeable about tax laws relating to IRA plans and may wish to share this knowledge with other users. The client-side process guidance software may provide a user interface that enables the user to enter explanatory information in a question-and-answer format, e.g., by entering both a question and an answer. After submitting the question and answer, the question may subsequently be displayed to a second user who comes to the same screen in the tax preparation software application, e.g., may be displayed within a list of other user-contributed questions that also relate to that screen. The second user may select the questions from the list in order to view their respective answers.

The client-side process guidance software may also enable a user to enter a question only (a question without an answer), e.g., where the user desires advice from other users. The client-side process guidance software may also enable a user to answer a question submitted by another user that has not yet been answered or may enable a user to provide an additional answer or comment for a question that has already been answered.

In addition to question and answer information 202, other examples of user-contributable help information shown in FIG. 2 include recommendations 204, articles 206, multimedia presentations 208, human expert directory information 210, and links to external resources 212. As described above, each type of help information may stored in association with context information so that the help information can be displayed to users when contextually relevant, e.g., when viewing a particular user interface screen.

Recommendations 204 may include recommendations relevant to various screens displayed by the process guidance software. For example, in a tax preparation application, if the current screen relates to itemized deductions then the tax preparation application may display user-contributed recommendations for maximizing deductions.

Articles 206 may include stories or articles relevant to various screens displayed by the process guidance software. For example, in a tax preparation application, if the current screen relates to a home business then the tax preparation application may display user-contributed articles related to tax laws for home businesses.

Multimedia presentations 208 may include multimedia presentations (e.g., audiovisual clips) relevant to various screens displayed by the process guidance software. For example, in a tax preparation application, if the current screen relates to stock sales then the tax preparation application may display user-contributed multimedia presentations related to stock sales.

Human expert directory information 210 may include contact information for human experts knowledgeable about various aspects of the process. For example, in a tax preparation application, if the current screen relates to foreign earned income then the tax preparation application may display user-contributed contact information for certified public accountants who specialize in preparing tax returns for expatriates.

For each of the above types of user-contributed help items, the client-side process guidance software may provide an appropriate user interface enabling users to submit the help item. For example, for a question and answer, the client-side process guidance software may display a first text input box for entering a new question or displaying a question previously submitted by another user and a second text input box for entering the answer. As another example, for a multimedia presentation, the client-side process guidance software may display a file dialog box enabling the user to browse to a particular multimedia file and a text input box for entering a brief description of the multimedia presentation.

Figure 3:
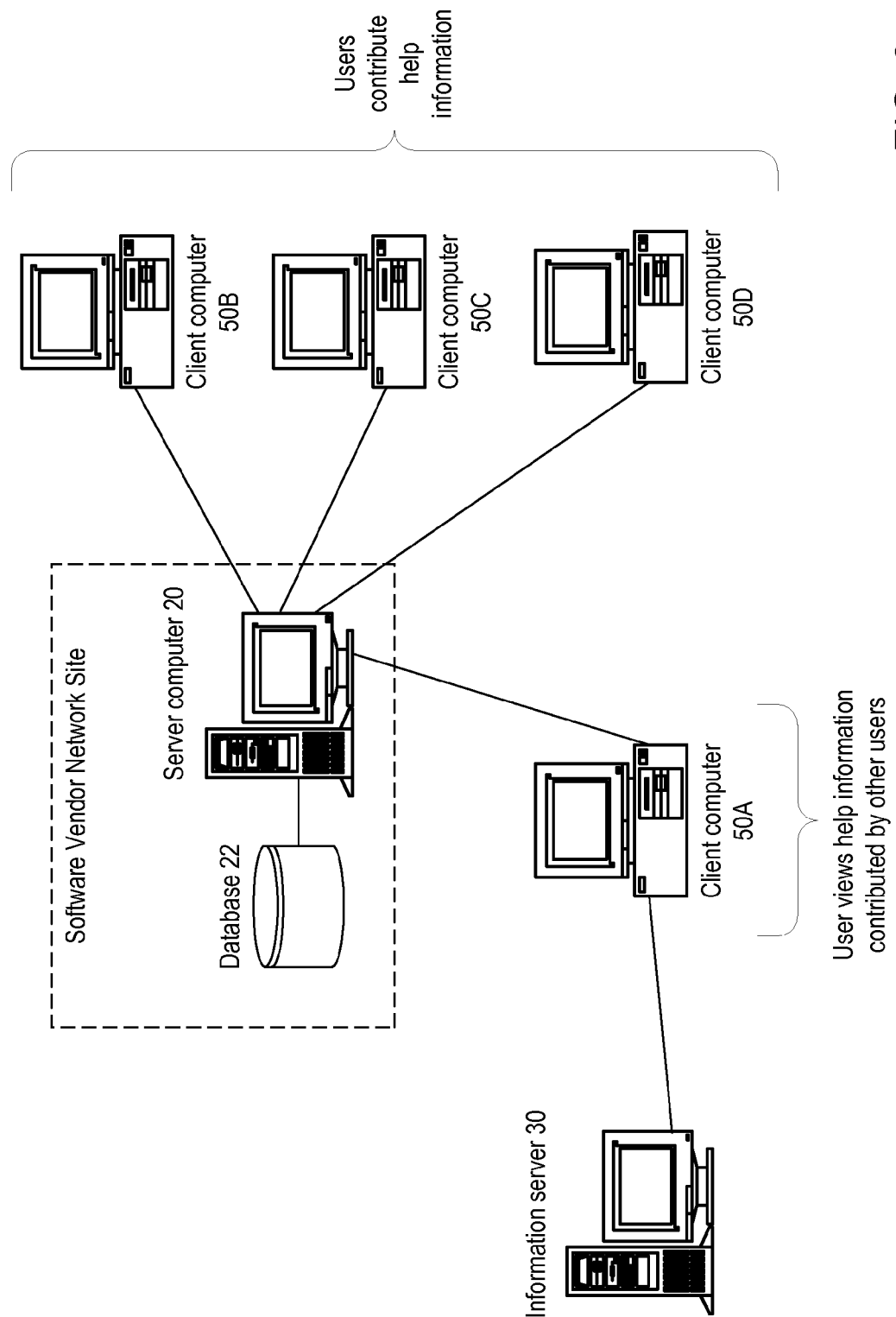
FIGS. 3 and 4 illustrate alternative embodiments of the system of FIG. 1.

As described above, when the user submits the help information, the help information may be sent or uploaded to the server computer 20 and stored by the server computer 20, e.g., in the database 22. In another embodiment, the user may submit a link 212 to an external resource, e.g., a resource that is not stored on or managed by the server computer 20. For example, instead of uploading a multimedia presentation to the server computer 20, a user may specify a uniform resource locator (URL) or other link to a multimedia presentation that is hosted by or stored on another information server 30, as shown in FIG. 3. Thus, the server computer 20 may simply store the URL or other link information instead of storing the multimedia presentation itself. Thus, for example, the server computer 20 may return the user-contributed link to the client computer 50A when a user of the client computer 50A accesses the respective screen, and the client computer 50A may then communicate with the information server 30 to access the multimedia presentation.

Figure 4:
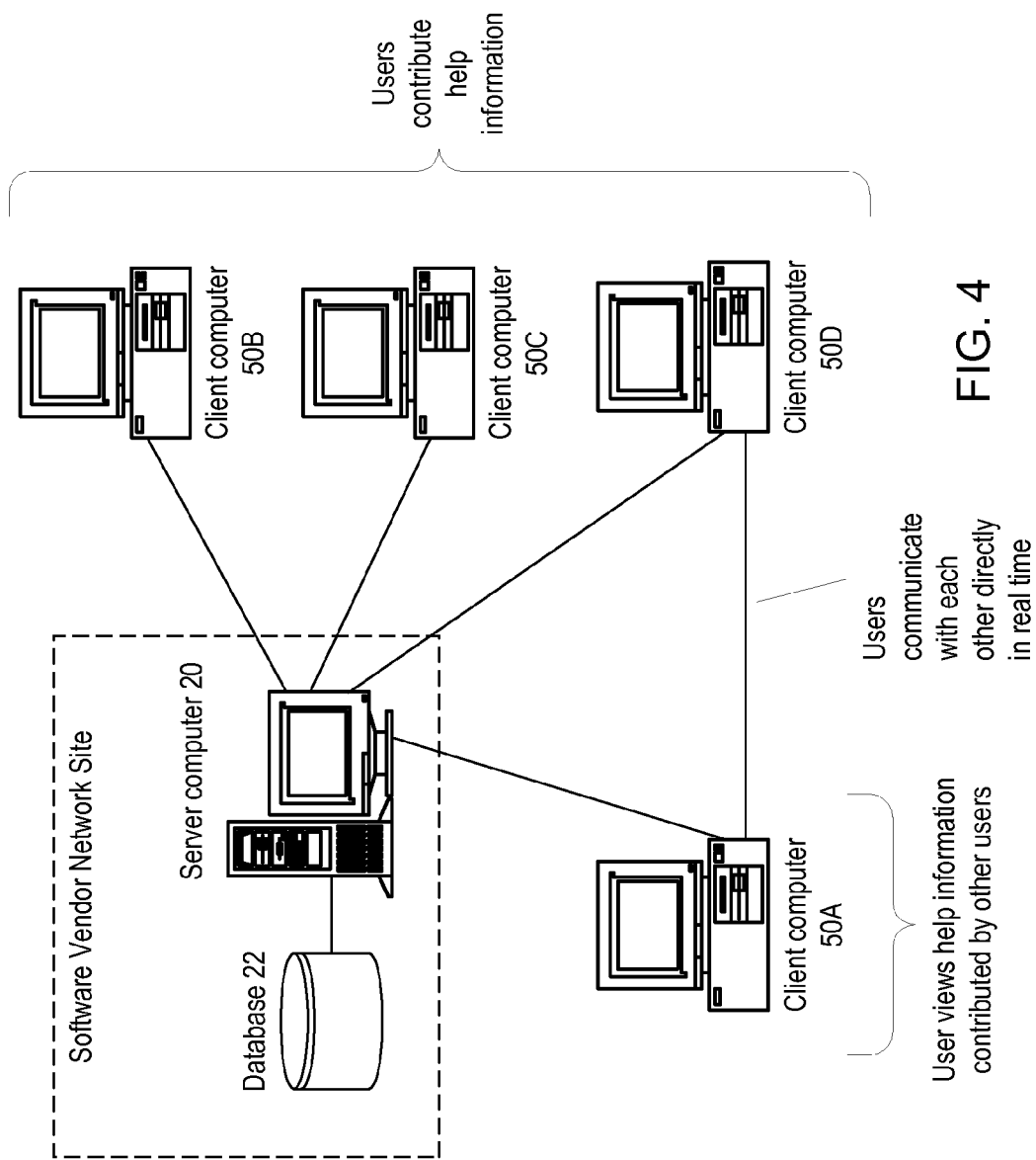

In one embodiment, in addition to displaying user-contributed help information in the manner described above, the client-side process guidance software on a given client computer 50 may be operable to establish network connections with the client-side process guidance software in another client computer 50, e.g., in order to allow users to communicate with each other in real time, as shown in FIG. 4. For example, when interacting with a first user interface screen, a first user of the client computer 50A may click a button or otherwise provide user input indicating that the first user has questions relating to the first screen and would like to chat with other users who may be able to help. In response, the server computer 20 may add the first user to a list of people who are currently online and have questions regarding the first screen. A second user of the client computer 50D who is knowledgeable about the aspect of the process to which the first screen relates may view the list of people who have questions regarding the first screen and may click a button or provide other user input in order to establish an electronic chat session or other real time communication session with the first user, e.g., in order to help the first user.

Any kinds of communication protocols may be used to allow the users to communicate with each other in real time in the manner described above. In some embodiments, communication between the users' respective client computers 50 may be facilitated by passing messages through the server computer 20 or another intermediate server. In other embodiments the client computers 50 may use a peer-to-peer communication protocol that enables them to communicate with each other without the communication being facilitated by a central server.

Figure 5:
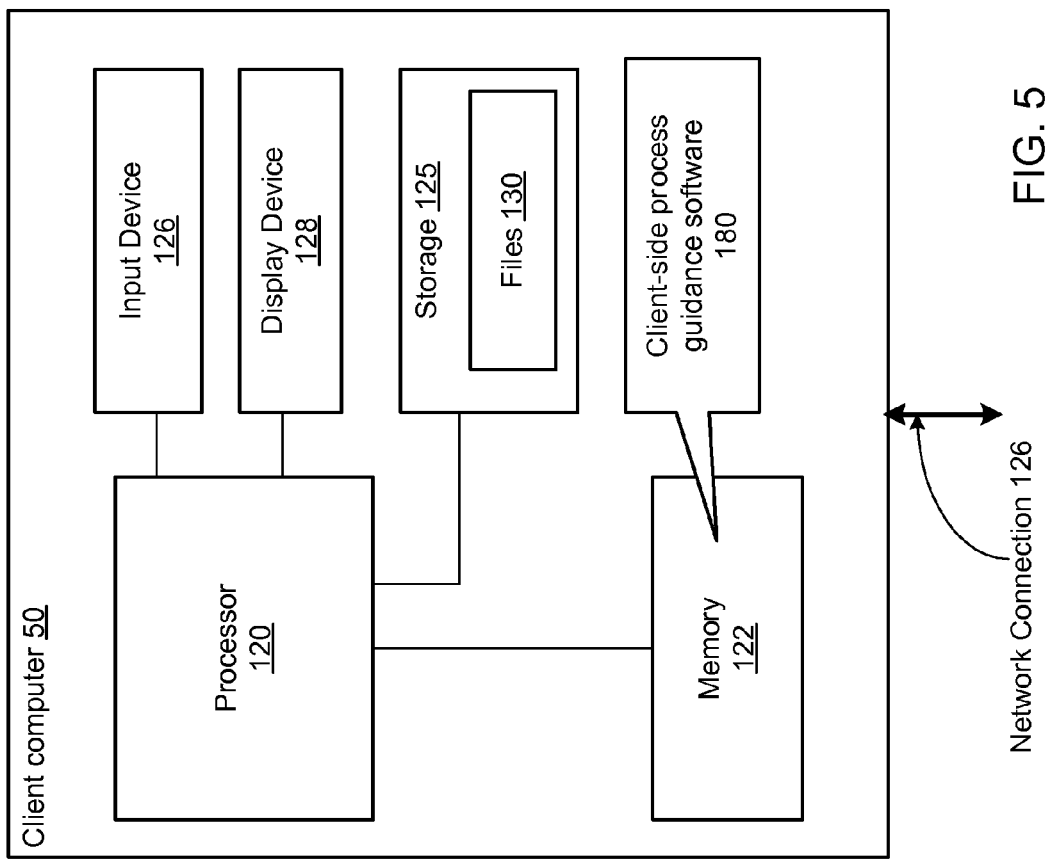
FIG. 5 illustrates one embodiment of a client computer in the system of FIG. 1.

Referring now to FIG. 5, one embodiment of a client computer 50 is illustrated. In various embodiments the client-side process guidance software may execute on any kind of client computer 50, and FIG. 5 represents an exemplary embodiment.

The client computer 50 includes a processor 120 coupled to a memory 122. In some embodiments, the memory 122 may include one or more forms of random access memory (RAM) such as dynamic RAM (DRAM) or synchronous DRAM (SDRAM). However, in other embodiments, the memory 122 may include any other type of memory instead or in addition. The memory 122 may be configured to store program instructions and/or data. In particular, the memory 122 may store client-side process guidance software 180 such as described above.

The processor 120 may be configured to execute the client-side process guidance software 180 stored in the memory 122. It is noted that the processor 120 is representative of any type of processor. For example, in one embodiment, the processor 120 may be compatible with the x86 architecture, while in another embodiment the processor 120 may be compatible with the SPARC™ family of processors. Also, in one embodiment the client computer 50 may include multiple processors 120.

The client computer 50 also includes one or more input devices 126 for receiving user input from a user of the client computer 50. The input device(s) 126 may include any of various types of input devices, such as keyboards, keypads, microphones, or pointing devices (e.g., a mouse or trackball).

The client computer 50 also includes a display device 128 for displaying output to the user. In particular, the client-side process guidance software 180 may display a series of user interface screens on the display device 128, as well as user-contributed help information, as described above. The display device 128 may comprise any of various kinds of display device, such as an LCD screen or monitor, CRT monitor, etc.

The client computer 50 also includes storage 125, e.g., one or more storage devices configured to store files 130 in a stable or non-volatile manner. In various embodiments the storage 125 may include any of various kinds of storage devices, such as optical storage devices or storage devices that utilize magnetic media, e.g., one or more hard drives or tape drives. In one embodiment, the storage 125 may be implemented as one or more hard disks configured as a disk storage system. In one embodiment, the disk storage system may be an example of a redundant array of inexpensive disks (RAID) system. In another embodiment, the disk storage system may be a disk array, or Just a Bunch Of Disks (JBOD), (used to refer to disks that are not configured according to RAID). In yet other embodiments, the storage 125 may include RAM disks, for example.

The client computer 50 also includes a network connection 126 through which the client computer 50 couples to the server computer 20 and possibly also to other client computers 50 or information servers 30. The network connection 126 may include any type of hardware for coupling the client computer 50 to a network, e.g., depending on the type of network. In various embodiments, the computers illustrated in FIGS. 1, 3, and 4 may be coupled to each other via any type of network or combination of networks. For example, the network may include any type or combination of local area network (LAN), a wide area network (WAN), an Intranet, the Internet, etc. Exemplary local area networks include Ethernet networks, Fiber Distributed Data Interface (FDDI) networks, and token ring networks. Also, each computer may be coupled to the network using any type of wired or wireless connection medium. For example, wired mediums may include Ethernet, fiber channel, a modem connected to plain old telephone service (POTS), etc. Wireless connection mediums may include a satellite link, a modem link through a cellular service, a wireless link such as Wi-Fi™, a wireless connection using a wireless communication protocol such as IEEE 802.11 (wireless Ethernet), Bluetooth, etc.

Figure 6:
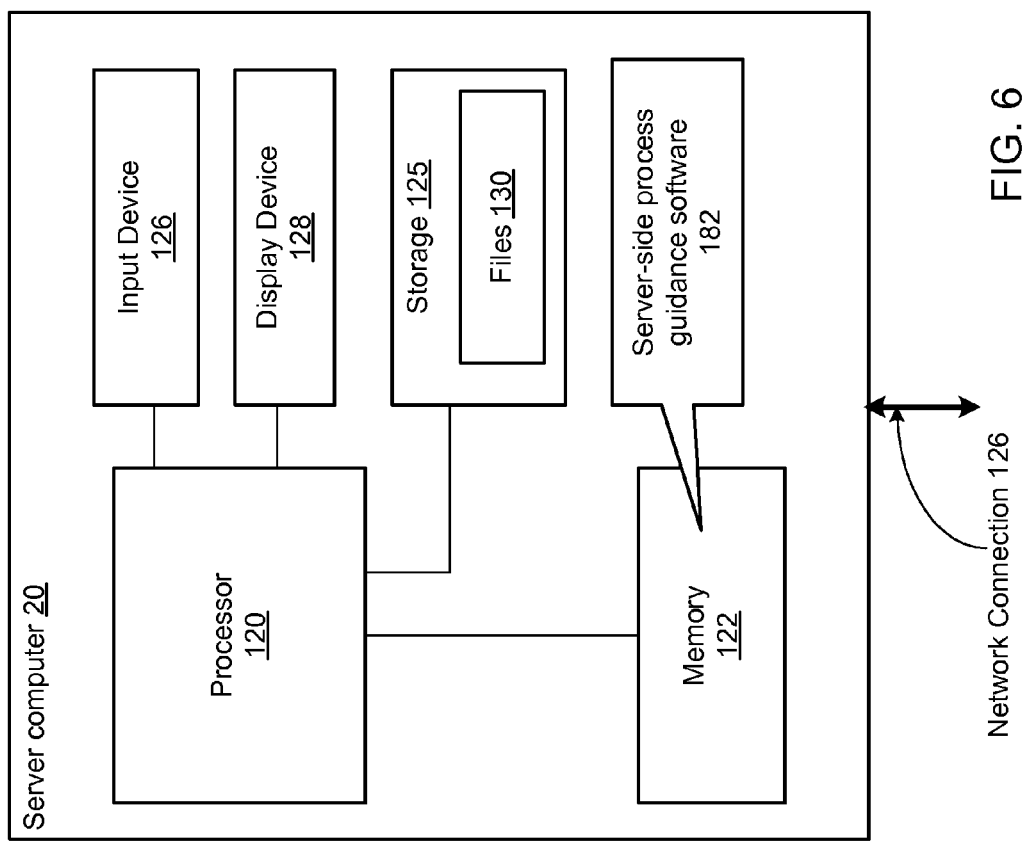
FIG. 6 illustrates one embodiment of the server computer in the system of FIG. 1.

FIG. 6 illustrates an example of the server computer 20 according to one embodiment. The server computer 20 includes similar elements as described above with respect to FIG. 5, but executes server-side process guidance software 182 instead of client-side process guidance software 180.

As discussed above, when the user comes to a given screen in the series of user-interface screens, the client-side process guidance software may communicate with the server-side process guidance software to receive help information that users have contributed for the given screen. In one embodiment, all of the help information that has been contributed for the given screen may be received and displayed to the user. In this embodiment, the only context information that is taken into account when determining which user-contributed help items to display may be which screen is currently being displayed. In other embodiments, however, various other types of context information may also be taken into account in addition to the current screen. In addition, information other than context information may also be taken into account when determining which of the user-contributed help items to display.

Figure 7A:
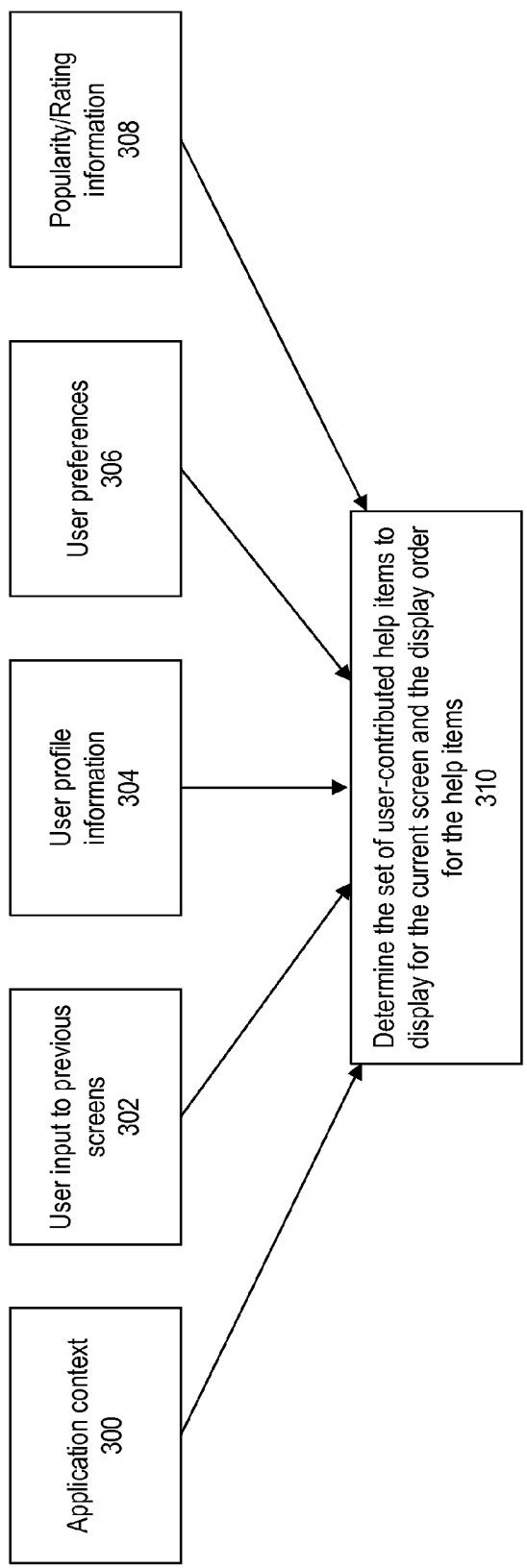
FIG. 7A illustrates examples of information that may be received and considered when selecting a set of user-contributed help items to display for a given user interface screen.

FIG. 7A illustrates several exemplary types of information that the process guidance software may receive and consider when selecting a set 310 of user-contributed help items to display for the current user interface screen. In some embodiments various types of information such as shown in FIG. 7A may also be used to determine an order in which the selected set of user-contributed help items should be displayed.

As shown, the set 310 of user-contributed help items to display may be determined and/or sorted based in part on application context information 300. The application context information 300 may comprise information specifying the user's context of interaction with the process guidance software, such as which user interface screen the user is currently viewing. Thus, the set of user-contributed help items to display may be determined based at least in part on which screen the user is currently viewing.

In some embodiments the application context information 300 may also include information indicating the user's context within the current screen. For example, if the screen displays a plurality of questions then the set of user-contributed help items to display may be determined based in part on which question the user is currently on (e.g., where the user's input cursor is). Thus, the set of displayed user-contributed help items may dynamically change as the user moves to different questions in the current screen.

As another example, the application context information 300 may specify one or more topics that are active with respect to the user's interaction context. For example, the client-side process guidance software may guide the user through a process by presenting a plurality of topics to the user or displaying user interface screens related to a plurality of topics. Each user interface screen may have one or more associated topics, and each user-contributed help item may be stored in association with one or more of the topics. Thus, the set 310 of user-contributed help items to display may be determined based at least in part on which topics are associated with the current user interface screen.

In some embodiments the set 310 of user-contributed help items to display may also be determined and/or sorted in part based on user input 302 that was received to previously displayed screens. For example, if the user passes through several user interface screens before coming to a given screen then the process guidance software may determine the set 310 of user-contributed help items to display for the given screen and/or may determine the display order for the set of user-contributed help items based in part on input that the user provided to one or more of the earlier screens.

In some embodiments the set 310 of user-contributed help items to display may also be determined and/or sorted in part based on user profile information 304. User profile information may include information such as the user's age, income, occupation, marital status, etc.

In some embodiments the set 310 of user-contributed help items to display may also be determined and/or sorted in part based on user-specified preferences 306. For example, the process guidance software may be operable to display a Preferences user interface that enables the user to specify various options that affect which user-contributed help items are displayed and/or how the user-contributed help items are sorted.

In some embodiments the set 310 of user-contributed help items to display may also be determined and/or sorted in part based on popularity or rating information 308. For example, brief descriptions of the user-contributed help items may initially be displayed in a list. The user may then select desired ones of the user-contributed help items to expand for complete viewing. In some embodiments the process guidance software may be operable to automatically track which user-contributed help items are selected by the user and may store popularity information on the server computer 20 indicating which user-contributed help items are most often selected. In another embodiment the user interface of the process guidance software may enable users to explicitly rank the usefulness of particular user-contributed help items. In some embodiments, popularity and/or ranking information 308 such as described above may be used to determine a display order for the user-contributed help items, e.g., by displaying more popular or higher ranked items before less popular or lower ranked items.

Thus, in some embodiments, the set of user-contributed help items that are displayed for a given user interface screen and/or the display order of the user-contributed help items may depend on various factors such as those described above and illustrated in FIG. 7A. Thus, in some embodiments, different users on different client computers 50 may see different sets of user-contributed help items when viewing the same user interface screen. For example, FIG. 7B illustrates an example in which two different sets of user-contributed help items are displayed for the same screen "A" on two different client computers 50. Even when the same items are included in both sets, their display order may be different. (For example, in FIG. 7B, User-contributed help item 1 is displayed before User-contributed help item 4 on the client computer 50A, but is displayed after User-contributed help item 4 on the client computer 50B.)

As a few examples of selection processes that may take factors such as those described above into account, consider an embodiment in which the process guidance software guides users through a process of preparing a tax return. In response to a user navigating to a particular screen, the process guidance software may select a set of user-contributed help items to display for the screen. In one embodiment, all user-contributed help items that are tagged as being associated with the current screen or tagged as being associated with topics associated with the current screen may be displayed to the user, e.g., may be displayed as a list that provides a brief description of each help item.

In other embodiments, the user-contributed help items that are tagged as being associated with the current screen may be filtered based on additional information so that only a subset of these user-contributed help items are displayed. For example, the user may have entered his personal demographic or financial information such as age, occupation, income, etc. In some embodiments, the user's demographic or financial information may be considered when determining which user-contributed help items to display to the user. For example, the process guidance software may only display help items that have been contributed by other users whose demographic/financial information matches the demographic/financial information of the user in question. As another example, the process guidance software may display all of the user-contributed help items that are tagged as being associated with the current screen, but may sort them so that the help items that have been contributed by other users whose demographic/financial information matches the demographic/financial information of the user in question are displayed before other help items. In various embodiments, any desired criteria or heuristic may be utilized in determining what constitutes a "match" between users.

As noted above, the user-contributed help items that are selected for display on the current user interface screen may be displayed as a list that provides a brief description of each help item. The help items in the list may be selectable in response to user input so that the user can request to view the full help information for particular help items he wants to view. In some embodiments the process guidance software may operate to track which help items are selected by users so that popularity of the respective help items may be determined. In other embodiments the process guidance software may enable users to indicate a usefulness ranking for particular help items. In some embodiments the user-contributed help items that are selected for display on the current user interface screen may be displayed in a sorted order based on their popularity and/or ranking statistics.

In some embodiments the process guidance software may group users into different categories. As one example, users may be categorized as either experts or normal users. For example, for a tax preparation software example, expert users may be tax professionals, such as certified public accountants or tax attorneys. In some embodiments the process guidance software may enable a user to input preference information indicating which user-contributed help items to display, based on which category of user has submitted the help items. For example, a user may choose to view only help items that have been contributed by expert users. As another example, the process guidance software may rank the users, e.g., based on user-submitted rankings of their respective help contributions. In one embodiment the user-contributed help items displayed on a given screen may be sorted based on the user rankings. The process guidance software may also display indications that visually distinguish different help items based on which users have contributed the help items, e.g., based on which categories the users are in or based on the users' rankings. In another embodiment the process guidance software may display the help items in a plurality of different areas on the screen, where each area displays only the help items that have been contributed by users from a particular category.

Figure 8:
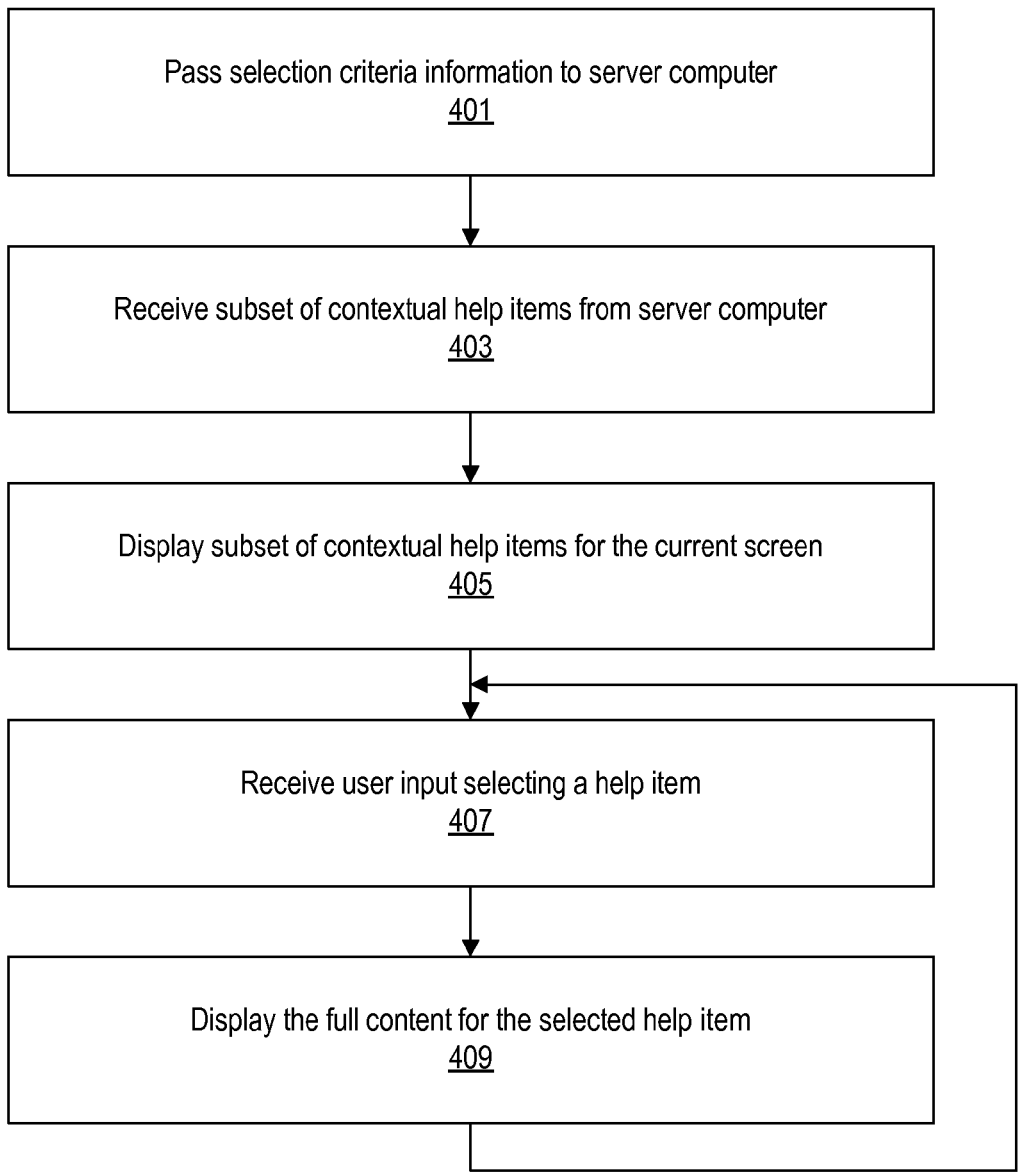
FIG. 8 is a flowchart diagram illustrating one embodiment of a method for displaying contextual help items for a user interface screen.
Figure 11:
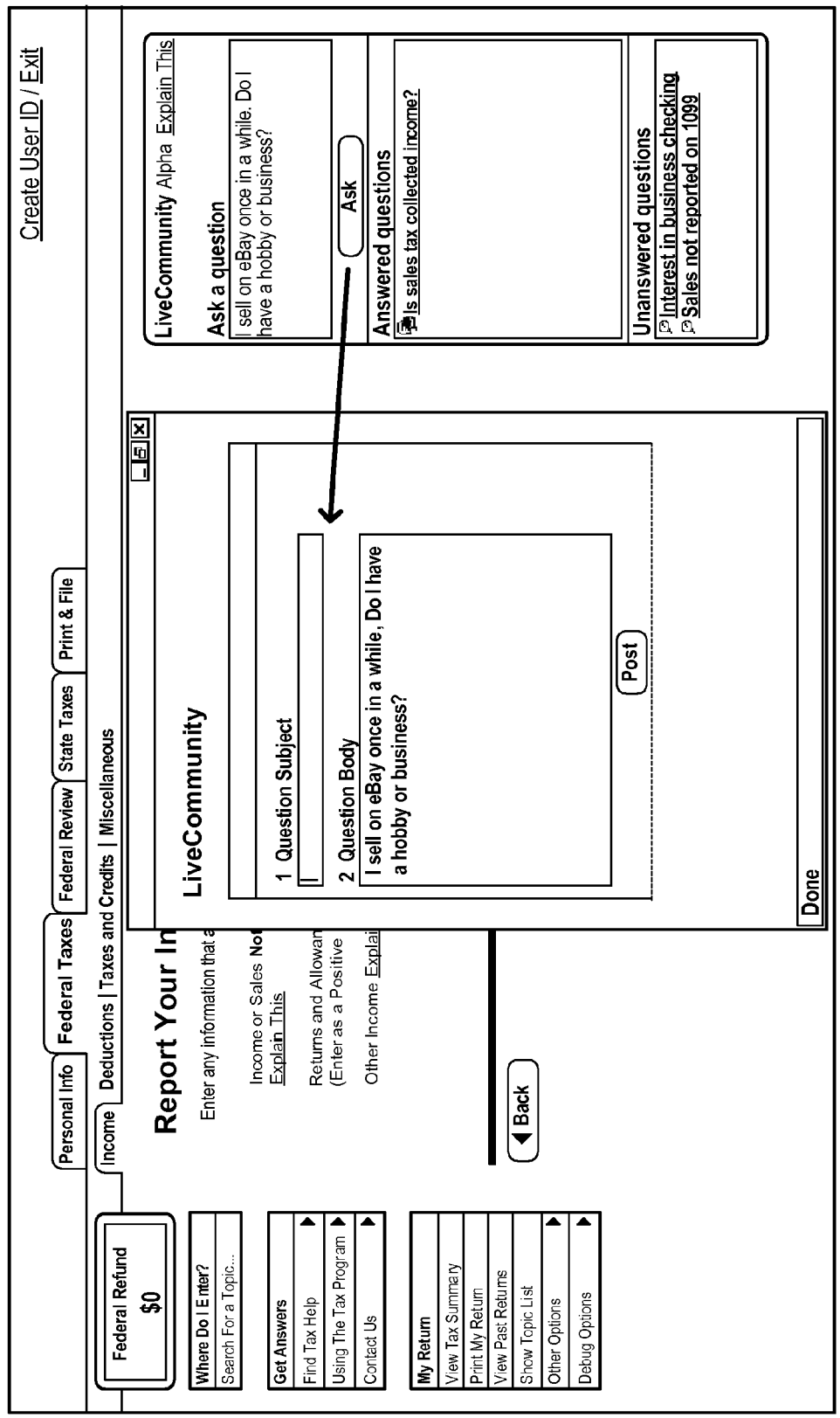

FIG. 8 is a flowchart diagram illustrating one embodiment of a method for displaying contextual help items for a given user interface screen. The method of FIG. 8 may be implemented by the client-side process guidance software 180 executing on a client computer 50.

As indicated in 401, when the user navigates to the user interface screen in question, the client-side process guidance software 180 may pass selection criteria information to the server-side process guidance software 182 on the server computer 20. The selection criteria information may include information such as described above with reference to FIG. 7A, e.g., application context information, information specifying user input to previous screens, user profile information, user preference information, etc.

In response to receiving the selection criteria information, the server-side process guidance software 182 on the server computer 20 may return a plurality of user-contributed help items to the client-side process guidance software 180, as indicated in 403. In one embodiment the server-side process guidance software 182 may return all of the contextual help items that are associated with the current user interface screen (where the current user interface screen is specified by the selection criteria information). In other embodiments the server-side process guidance software 182 may select and return only a subset of the possible contextual help items that are associated with the current user interface screen, e.g., where the subset is selected based on additional selection criteria information in addition to the current user interface screen, as described above.

In another embodiment the client-side process guidance software 180 may not pass the selection criteria information to the server-side process guidance software 182. Instead, the client-side process guidance software 180 may receive all of the contextual help items associated with the current user interface screen from the server-side process guidance software 182 and may then select a subset of the help items based on the selection criteria information. In other embodiments, both the client-side process guidance software 180 and the server-side process guidance software 182 may operate to determine the subset of help items to display for the current screen. For example, the server-side process guidance software 182 may return a first subset of the help items to the client-side process guidance software 180 based on first selection criteria information, and the client-side process guidance software 180 may then further filter the first subset into a second, smaller subset of help items based on second selection criteria information.

As shown in 405, the client-side process guidance software 180 may display the selected subset of contextual help items on the display device of the client computer 50. As described above, in addition to determining the subset of contextual help items, the server-side process guidance software 182 and/or the client-side process guidance software 180 may also determine a display order for the subset of contextual help items. Thus, the subset of contextual help items may be displayed in the determined display order. As one example, the subset of contextual help items may be sorted based on popularity or ranking information, as described above.

Displaying the selected subset of contextual help items in 405 may comprise displaying only a portion of each help item, such as a name, title, or other brief description of each help item. For example, where the contextual help items include question-and-answer items, only the question or subject of the question may be displayed. As another example, where the contextual help items include articles, only titles of the articles may be displayed. The names, titles, or other brief descriptions of the various help items may be selectable by the user in order to view the full help items. For example, as indicated in 407, the user may provide user input selecting a given help item, e.g., by clicking on the help item from the displayed list. In response, the client-side process guidance software 180 may display the full content for the selected help item.

In various embodiments the brief descriptions of the help items may be displayed in any of various ways. In some embodiments the brief descriptions of the help items may be displayed within the user interface screen. For example, the user interface screen may have a dedicated area in which a list of the brief descriptions of contextually relevant user-contributed help items are displayed. When the user clicks on or otherwise selects one of the brief descriptions from the displayed list, the full content for the selected item may be displayed in another window. The full content may be displayed in any of various ways, e.g., depending on the type of help item that was selected. For example, a question-and-answer help item may be displayed as text information, whereas a multimedia help item may be displayed or played as audiovisual information.

FIG. 9 is a flowchart diagram illustrating one embodiment of a method for adding a new user-contributed help item for a given user interface screen. The method of FIG. 9 may be implemented by the client-side process guidance software 180 executing on a client computer 50.

In 501 the client-side process guidance software 180 may display a user interface enabling the user to contribute new help information relevant to the current screen. As described above, the type of user interface that is displayed may depend on the type of help item being contributed, such as a question-and-answer item, article, multimedia presentation, etc.

In 503, the client-side process guidance software 180 receives user input specifying the help information for a new help item, as described above.

In 505, the client-side process guidance software 180 sends the help information for the new help item to the server-side process guidance software 182 on the server computer 20. In response, the server-side process guidance software 182 stores information representing the new help item.

In 505, the client-side process guidance software 180 may also send context information for the new help item to the server-side process guidance software 182. The context information may be stored in association with the new help item. For example, the context information may include various types of information such as application context information, information specifying user input to previous screens, user profile information, user preference information, etc. The context information may subsequently be used when selecting which user-contributed help items to display for the user-interface screen on other client computers 50, as described above.

Various embodiments of the system and methods described above may be utilized for a process guidance software application in order to enable users to contribute and share help information with each other. Thus, the help information available to users of the process guidance software may grow over time as users contribute more and more help information. Enabling new help information to be contributed in this manner may be useful for aiding users in performing complex processes. As one example, users of a tax preparation software application may contribute help information related to specific tax questions or tax situations, which may help other users prepare their tax returns.

Further embodiments of the system described above may not only allow users to contribute new help information but may also be operable to automatically search for new help items to add. For example, in one embodiment the server computer 20 may be connected to the Internet and may be operable to automatically perform a "web crawl" in order to find resources stored on or hosted by other computers connected to the Internet. For example, resources on the other computers, such as web pages, documents, etc., may be automatically analyzed in order to determine whether they contain content that is relevant to one or more topics of the process guidance software. When a relevant resource is found, the server computer 20 may store a link to the resource in association with the respective topic. Thus, when the user interface screen in which the topic appears is displayed, a help item that links to the resource may be displayed in the user interface screen. For example, the user interface screen may include a separate area for automatically located resources, or the automatically located resources may be displayed together with the list of user-contributed help items.

Figure 12:
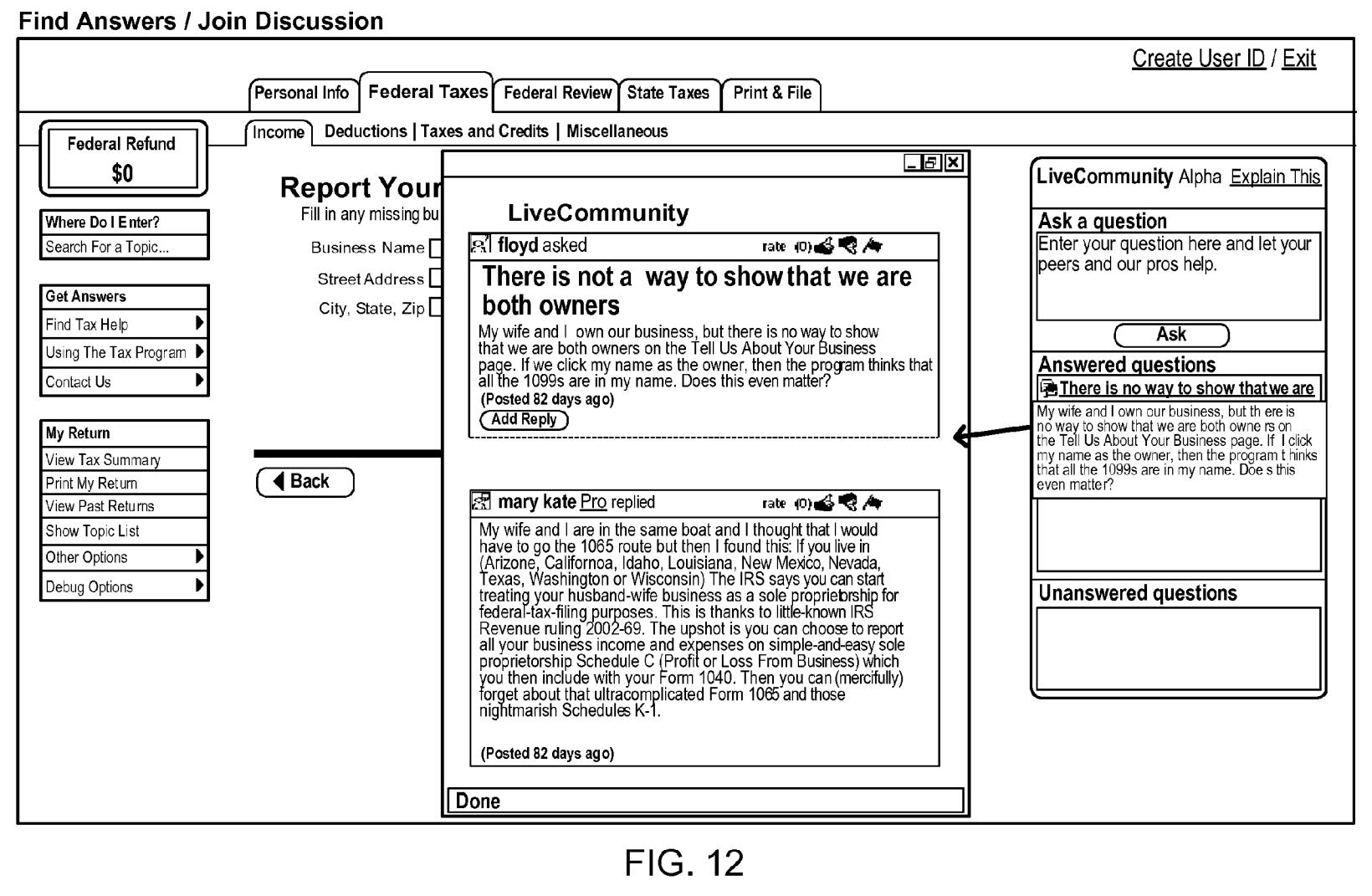

FIGS. 10-16 illustrate exemplary user interface screens for a tax preparation software application that implements embodiments of the methods described above.

Figure 13:
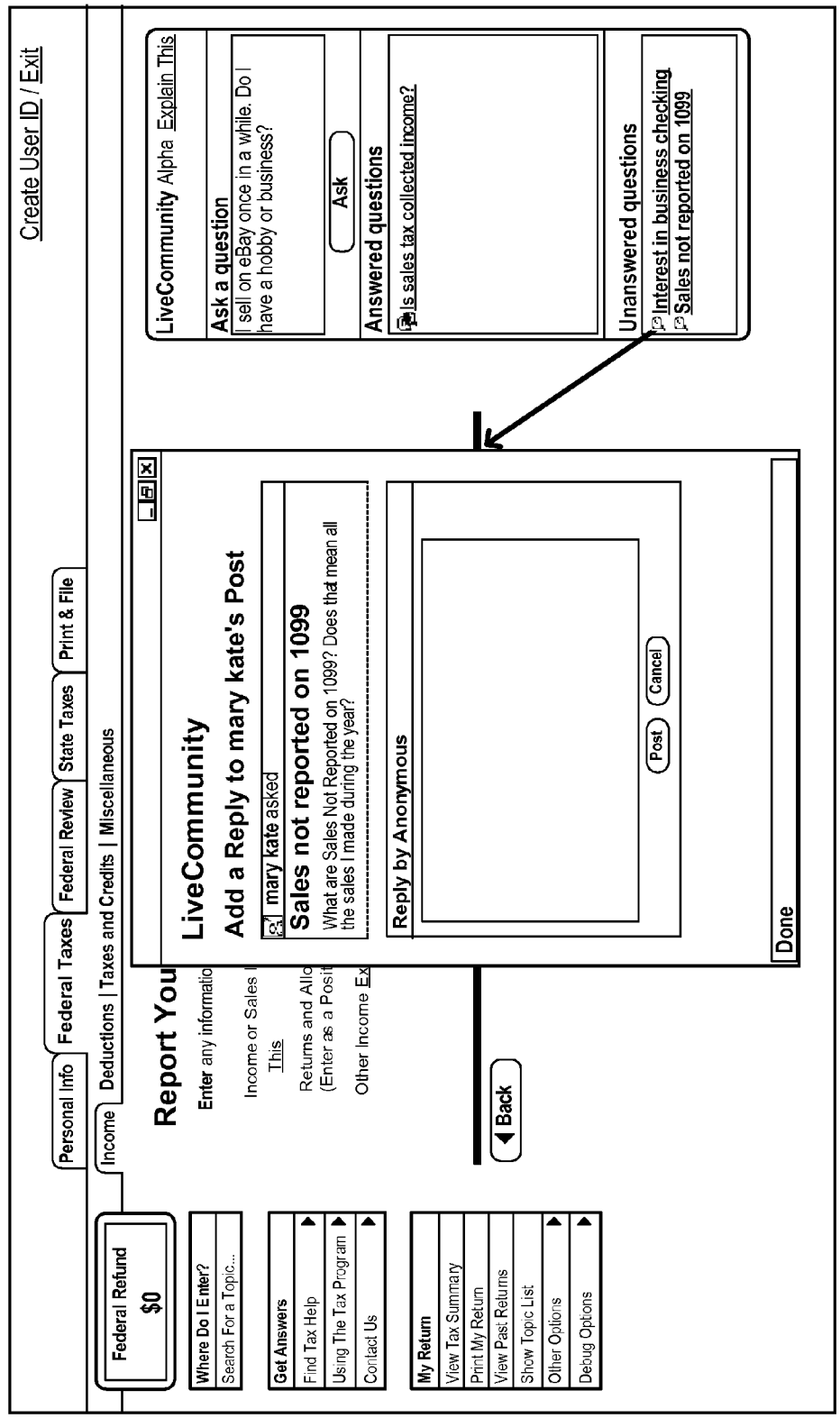

FIG. 10 illustrates a screen for entering income information. The screen includes a user interface area 800 that enables the user to ask a new question, a user interface area 802 that displays questions that have been answered, and a user interface area 804 that displays questions that have been asked but not yet answered. If the user clicks on the "Ask" button in the area 800 then the window illustrated in FIG. 11 appears, which enables the user to input a subject and body for a new question. The subject serves as a brief description for the question, and the body enables the user to present the question in full detail. After submitting the question, the subject may subsequently appear in the area 804 of unanswered questions when users navigate to the same user interface screen. Another user may click on the subject in order to cause a window to appear with the question's body and an area for answering the question, as illustrated in FIG. 13. After answering the question, the question subject may then appear in the area 802 instead of the area 804.

The user may click on the question subjects in the area 802 in order to view the question body and any answers that have been provided by other users. For example, in FIG. 12, a user has clicked on a question subject to cause the illustrated popup window to appear.

Figure 14:
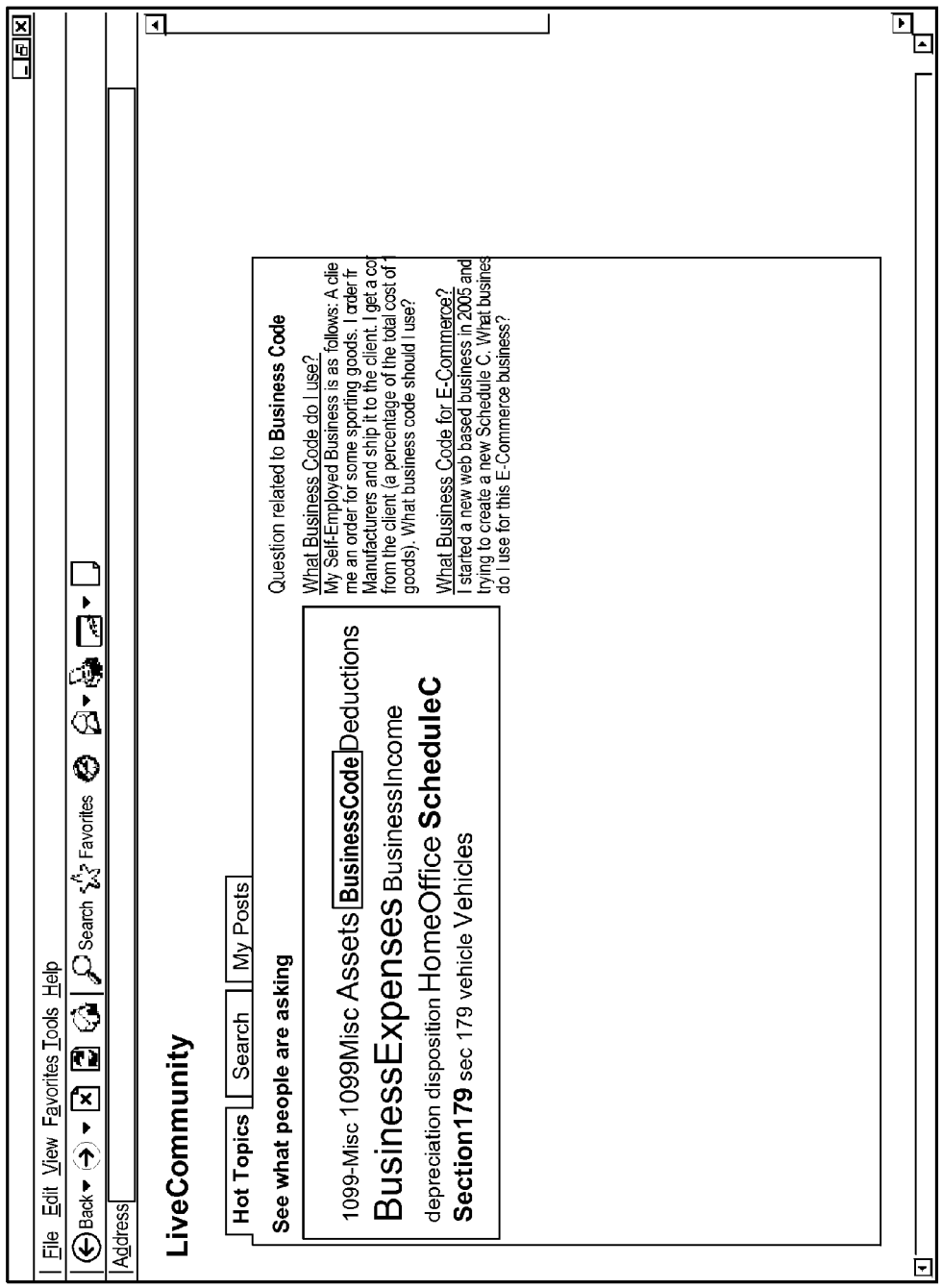

FIG. 14 illustrates a window in which a "Hot Topics" tab has been selected. This window may present a view of various topics that are particularly active, e.g., with users asking relatively many questions about these topics. The user may click on the topics shown on the left side of the window to cause corresponding questions to be displayed on the right side of the window.

Figure 15:
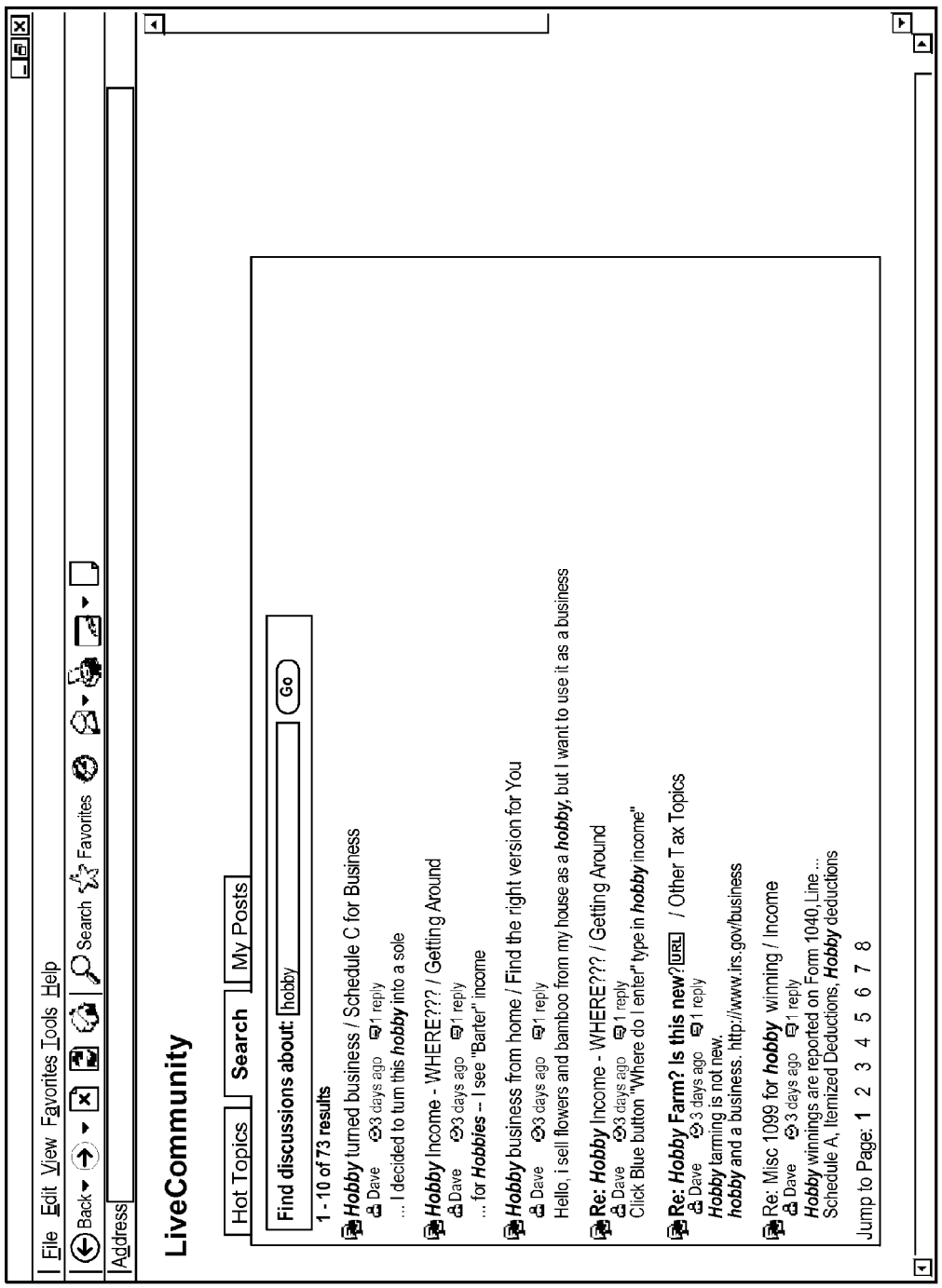

FIG. 15 illustrates a window in which a "Search" tab has been selected. The "Search" tab may enable the user to perform a search through various questions that have been asked by users. In the illustrated embodiment the search may be performed across all topics, e.g., questions contributed for all user interface screens may be searched. In other embodiments the Search user interface may include filtering options to restrict the search in various ways, e.g., by searching only certain topics (e.g., questions contributed for only certain user interface screens), searching for questions asked or answered by specific users or users who meet certain criteria, searching for questions posted within specific date ranges, etc.

Figure 16:
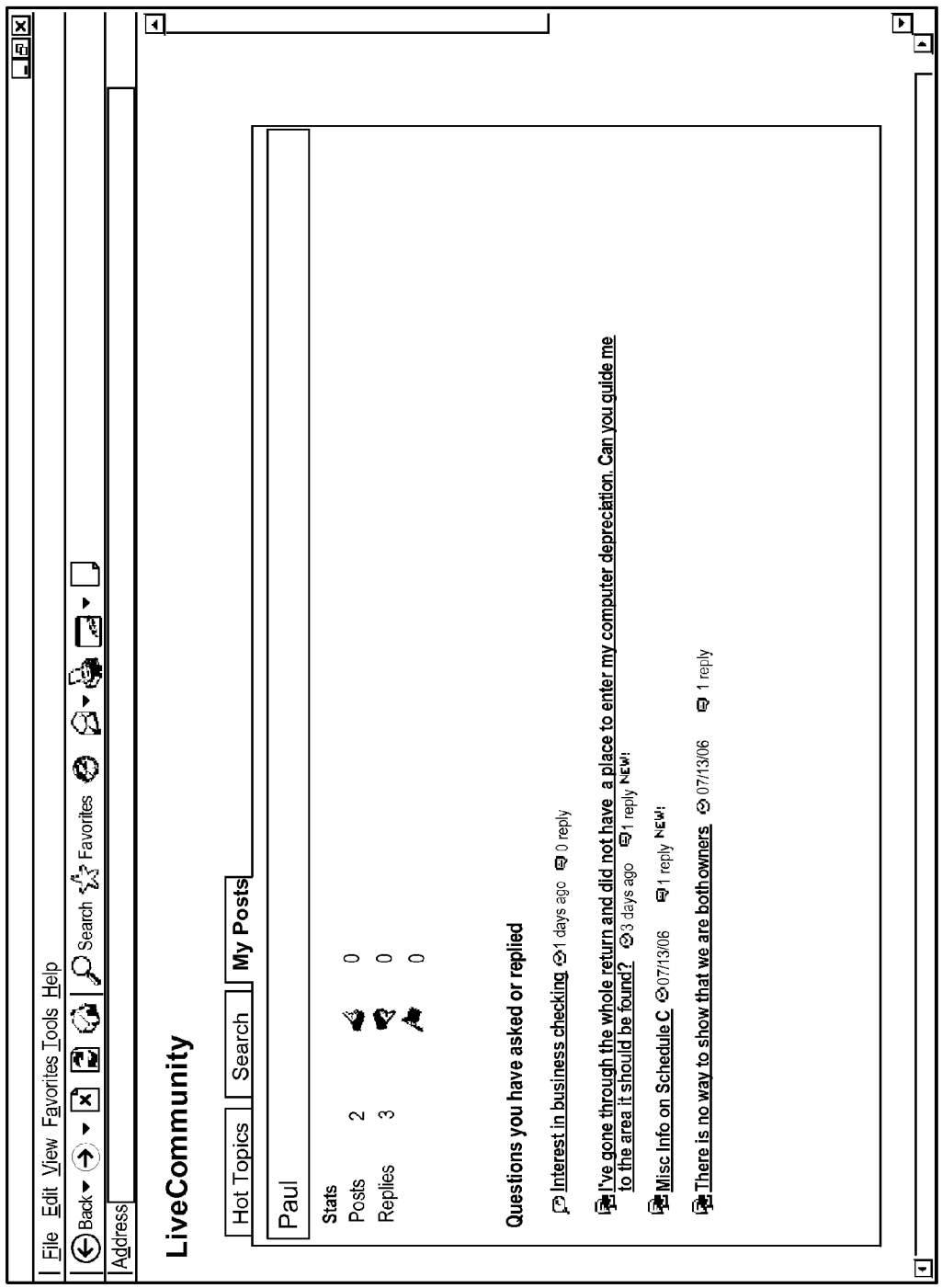

FIG. 16 illustrates a window in which a "My Posts" tab has been selected. The My Posts tab may enable the user to view all questions that the user has asked and/or all questions that the user has answered.

It is noted that various embodiments may further include receiving, sending or storing instructions and/or data implemented in accordance with the foregoing description upon a computer-readable memory medium. Generally speaking, a computer-readable memory medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. for storing program instructions. Such a computer-readable memory medium may store program instructions received from or sent on any transmission media or signals such as electrical, electromagnetic, or digital signals, conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-implemented method for displaying information for a software application, the method comprising:
    displaying a first screen of a series of screens configured to guide a first user through a process associated with the software application;
    receiving, from a second user, help information to resolve an issue associated with the first screen while the second user is guided through the process associated with the software application and wherein the help information is an added user-contributed help item contributed by the second user;
    receiving, from the first user, a help request to resolve the issue associated with the first screen, wherein the help request comprises criteria entered by the user in a search tab on the first screen;
    in response to the help request, retrieving a plurality of help questions matching the criteria entered by the user in the search tab, wherein at least one of the plurality of help questions are contributed by other users including the second user;
    filtering, using the processor and based on a context of the first screen, the plurality of help questions to generate a help question subset from the plurality of help questions;
    presenting the help question subset to the first user;
    receiving a selection of a help question from the help question subset;
    determining contextual help information associated with the help question, wherein the contextual help information comprises the added user-contributed help item contributed by the second user;
    filtering, using a processor of a computer and based on an amount of income associated with the first user, the contextual help information associated with the help question to generate a first contextual help information subset, wherein the first contextual help subset comprises the added user-contributed help item contributed by the second user; and
    displaying, for the first user, the first contextual help information subset on the first screen.

2. The method of claim 1, wherein the first screen requests the first user to answer one or more process questions, and wherein the first user answers the one or more process questions using the first contextual help information subset.

3. The method of claim 1, wherein a second screen is displayed after a first screen, wherein the first screen requests the first user to answer one or more process questions, and wherein a second contextual help information subset displayed for the second screen is determined based on the first user's answers to the one or more process questions of the first screen.

4. The method of claim 1, further comprising:
    displaying the series of screens on a first computer system, wherein generating the first contextual help information subset associated with the first screen comprises receiving the first contextual help information subset from a second computer system coupled to the first computer system via a network, wherein said receiving the first contextual help information subset from the second computer system comprises receiving the help information contributed by the second user of the software application from the second computer system.

5. The method of claim 1, wherein displaying the first contextual help information subset for the first screen comprises displaying one or more links to information relevant to the first screen, wherein the one or more links are contributed by the other users of the software application.

6. The method of claim 1, further comprising:
    displaying one or more user interface elements that enable the first user to contribute an additional added user-contributed help item for the first screen.

7. The method of claim 1, wherein generating the first contextual help information subset associated with the first screen comprises determining a plurality of help items for the first screen, wherein the method further comprises sorting the plurality of help items for the first screen into a sorted order, and wherein displaying the first contextual help information subset for the first screen comprises displaying the plurality of help items for the first screen in the sorted order.

8. The method of claim 7, wherein the plurality of help items for the first screen are sorted based on a popularity algorithm.

9. The method of claim 1, wherein the process is associated with preparing a tax return, wherein the contextual help information subset for the first screen includes tax information contributed by the other users of the software application, and wherein the other users include the second user.

10. A computer-readable storage medium, comprising program instructions computer-executable to:
    display a first screen of a series of screens configured to guide a first user through a process associated with a software application;
    receive, from a second user, help information to resolve an issue associated with the first screen while the second user is guided through the process associated with the software application and wherein the help information is an added user-contributed help item contributed by the second user;
    receive, from the first user, a help request to resolve the issue associated with the first screen, wherein the help request comprises criteria entered by the user in a search tab on the first screen;

in response to the help request, retrieve a plurality of help questions matching the criteria entered by the user in the search tab, wherein at least one of the plurality of help questions are contributed by other users including the second user;

filter, based on a context of the first screen, the plurality of help questions to generate a help question subset from the plurality of help questions;

present the help question subset to the first user;

receive a selection of a help question from the help question subset;

determine contextual help information associated with the help question, wherein the contextual help information comprises the added user-contributed help item contributed by the second user;

filter, based on an amount of income associated with the first user, the contextual help information associated with the help question to generate a first contextual help information subset, wherein the first contextual help information subset comprises the added user-contributed help item contributed by the second user; and display, for the first user, the first contextual help information subset on the first screen.

11. The computer-readable storage medium of claim 10, wherein the first screen requests the first user to answer one or more process questions, and wherein the first user answers the one or more process questions using the contextual help information subset.

12. The computer-readable storage medium of claim 10, wherein the program instructions are further executable to:
display one or more user interface elements that enable the first user to contribute an additional added user-contributed help item for the first screen.

13. The computer-readable storage medium of claim 10, wherein the process is associated with preparing a tax return, wherein the contextual help information subset for the first screen includes tax information contributed by the other users of the software application, and wherein the other users include the second user.

14. A system, comprising:
a processor; and
a memory coupled to the processor, wherein the memory stores program instructions executable by the processor to:
display a first screen of a series of screens configured to guide a first user through a process associated with a software application;
receive, from a second user, help information to resolve an issue associated with the first screen while the second user is guided through the process associated with the software application and wherein the help information is an added user-contributed help item contributed by the second user;
receive, from the first user, a help request to resolve the issue associated with the first screen, wherein the help request comprises criteria entered by the user in a search tab on the first screen;
in response to the help request, retrieve a plurality of help questions matching the criteria entered by the user in the search tab, wherein the plurality of help questions are contributed by other users including the second user;
filter, based on a context of the first screen, the plurality of help questions to generate a help question subset from the plurality of help questions;
present the help question subset to the first user;
receive a selection of a help question from the help question subset;
determine contextual help information associated with the help question, wherein the contextual help information comprises the added user-contributed help item contributed by the second user;
filter, based on an amount of income associated with the first user, the contextual help information associated with the help question to generate a contextual help information subset, wherein the contextual help information subset comprises the added user-contributed help item contributed by the second user; and
display, for the first user, the contextual help information subset on the first screen.

15. The system of claim 14, wherein the contextual help information subset associated with the first screen comprises a plurality of help items including the added user-contributed help item, wherein the program instructions further cause the processor to sort the plurality of help items for the first screen into a sorted order, and wherein presenting the contextual help information subset for the first screen comprises presenting the plurality of help items for the first screen in the sorted order.

16. The system of claim 15, wherein the plurality of help items for the first screen is sorted based on a popularity algorithm.

17. The system of claim 14, wherein the program instructions further cause the processor to receive, from the first user, an additional added user-contributed help item for the first screen, wherein the additional added user-contributed help item for the first screen is used by a future user.

* * * * *